Jan. 28, 1969 J. D. BROWDER 3,424,994

SIGNAL-TO-NOISE RATIO ENHANCER

Filed Jan. 6, 1965

INVENTOR.
J. D. BROWDER

BY George E. Pearson
ATTORNEY

United States Patent Office 3,424,994
Patented Jan. 28, 1969

3,424,994
SIGNAL-TO-NOISE RATIO ENHANCER
Jewel D. Browder, 1031 Alexandria Drive,
San Diego, Calif. 92407
Filed Jan. 6, 1965, Ser. No. 423,769
U.S. Cl. 330—142 1 Claim
Int. Cl. H03g *3/06, 3/20*

ABSTRACT OF THE DISCLOSURE

An active noise-limiting device is disclosed having significant value in suppressing impulse-noise disturbances as encountered in electrical communication systems, and the like, having input signals of constant amplitude. It comprises a Class A amplifier operated at rated voltage and currents in a substantially fully loaded manner in response to a predetermined signal input level so that the signals are amplified throughout the whole linear portion of the grid-voltage plate-current curve and the noise pulses accompanying the signals and superimposed thereon are forced into the nonlinear portions of the curve and accordingly receive very little amplification. Thus, for an obvious reason, the noise-limiting device is termed a gorged amplifier, yet it enhances the signal-to-impulse ratio because it amplifies signals to a greater degree than it amplifies noise pulses.

*Background of the invention*

My invention relates to the transmission and reception of alternating-current electrical signals and more particularly to the art of suppressing interfering noise disturbances which may seriously impair the clarity and intelligibility of said signals. It relates particularly to improvements for enhancing the signal-to-noise ratio by the process of suppressing electrical noise disturbances caused by atmospheric static as well as by various man-made electrical devices.

The present invention derives from my recent discovery of a phenomenon relating to the operation of an amplifying device. This phenomenon is difficult to explain in the light of the knowledge of the prior art but which is readily demonstrated in the manner hereinafter to be fully described, wherein the phenomenon is manifested in an amplifying device operating under conditions which heretofore have not been employed to amplify signals to a greater degree than it amplifies noise disturbances particularly those of the well-known impulse variety.

As otherwise expressed the inventive concept here involved is one in which an amplifying device having an operating rage which includes favorable and unfavorable signal-amplifying portion, and wherein the signal is amplified in the favorable portion and accompanying noise disturbances are amplified in the unfavorable portions, whereby to enhance the signal-to-noise ratio of the output signal. A gain, the manner in which this is accomplished will best be understood from circuit examples to be hereinafter described.

The problem of suppressing and eliminating impulse noise disturbances has challenged many investigators since the advent of wireless telegraphy. Many solutions have been devised for use with radio receivers, some functioning in connection with the detector, some in the IF (intermediate-frequency) section, and others as a separate unit joined between the receiver and antenna. But the performance of these is generally unsatisfactory because they (a) do not suppress a noise disturbance to an amplitude that lies below the amplitude of the accompanying signal, (b) fail to operate on all types of impulse-noise disturbances, (c) distort the signal in proportion to the amount of noise suppression accomplished, and (d) deteriorate signal intelligibility by punching "holes" in the signals.

In contrast to conventional noise suppressing devices the present invention contemplates (a) the reduction of noise disturbances to amplitudes which lie considerably below the amplitudes of accompanying signals, (b) effective performance with all variations of electrical transient or impulse noise disturbances including the different kinds of natural static, (c) noise suppression without signal distortion, and (d) noise suppression without punching "holes" in the signals.

According to the theory of the present invention, these contemplated features are achieved by (a) recognition of the basic principle that noise impulses do not modulate a radio-frequency carrier but superpose themselves thereon by adding thereto with respect to algebraic signs, and (b) utilization of the aforesaid recently discovered phenomenon occurring in an amplifying device and which, when operated in accordance with the theory and principle of the present invention, is itself a vivid manifestation of said basic noise-superposition principle. As a matter of fact, the performance of the present invention is regarded as positive proof of said noise-superposition principle, a principle which is not treated in the literature except possibly and vaguely in a mathematical sense and then only without sufficient emphasis to distinguish it from the principle of modulation.

It has long been generally believed by communication engineers that when a noise impulse is impressed on a sinsusoid, a process of modulation occurs particularly when the combined impulse and sinusoid pass through a vacuum-tube amplifier. Such a concept, it is said, is supported by Fourier's theorem which states that periodic pulses or nonsinusoids can be resolved into basic building blocks consisting of harmonically related sinusoids. Apparently, however, Fourier's theorem has been so confused that the above term: "harmonically related sinusoids" has been superseded by the term "continuous spectrum of frequencies." Reference to this is found in the textbook Theory and Applications of Electron Tubes, Herbert J. Reich, 2nd edition, page 341, 1944, McGraw-Hill Book Co., New York.

The present invention—by virtue of its performance—disproves two widely accepted concepts pertaining to the problem of electrical noise suppression. One of these is the popular concept that atmospheric static disturbances modulate a radio-frequency carrier and cannot be removed in the receiver where they become parts of the audio signal just as elements of speech or music. The other widely accepted concept relates to the well-known ringing voltages or free oscillations of a resonant circuit which are believed to have essentially the same characteristic properties as those possessed by sinusoids and thus cannot be eliminated without also eliminating the signals.

A significant feature of the invention is that it reduces the amplitudes of noise disturbances generally encountered to levels which lie below the amplitudes of accompanying signals.

Still another and equally important feature of the invention is that all manner of impulse noise disturbances ordinarily encountered in practice, including said ringing voltages or free oscillations, are suppressed with virtually equal facility, with the limiting factors comprising only the peak amplitude and pulse repetition rate.

*Objects of the invention*

The principal object of my invention is to provide a signal-to-noise ratio enhancer which increases the quality and intelligibility of electrical signals by suppressing the amplitudes of virtually all extraneous noise disturbances that may accompany or otherwise be associated with said signals.

Another object of my invention is to provide a signal-to-noise ratio enhancer which is applicable throughout the entire area of alternating-current signal transmission and reception as accomplished by land-line or wire telephone and telegraph carrier systems, radar and sonar detection systems, and the several varieties of radio communication and navigation systems.

Still other features, advantages and objects of the present invention other than those heretofore specifically set forth are those inherent in or to be implied from the novel circuit arrangements and elements employed in the various modifications and embodiments herinafter to be described which represent the best mode thus far devised for practicing the principles of the invention.

A full understanding of the invention may be had by referring to the following description and claim, taken in conjunction with the accompanying drawings in which like numbers refer to like parts, forming a part of this specification, and in which drawings:

*Specification*

Figures 1, 2, 3:
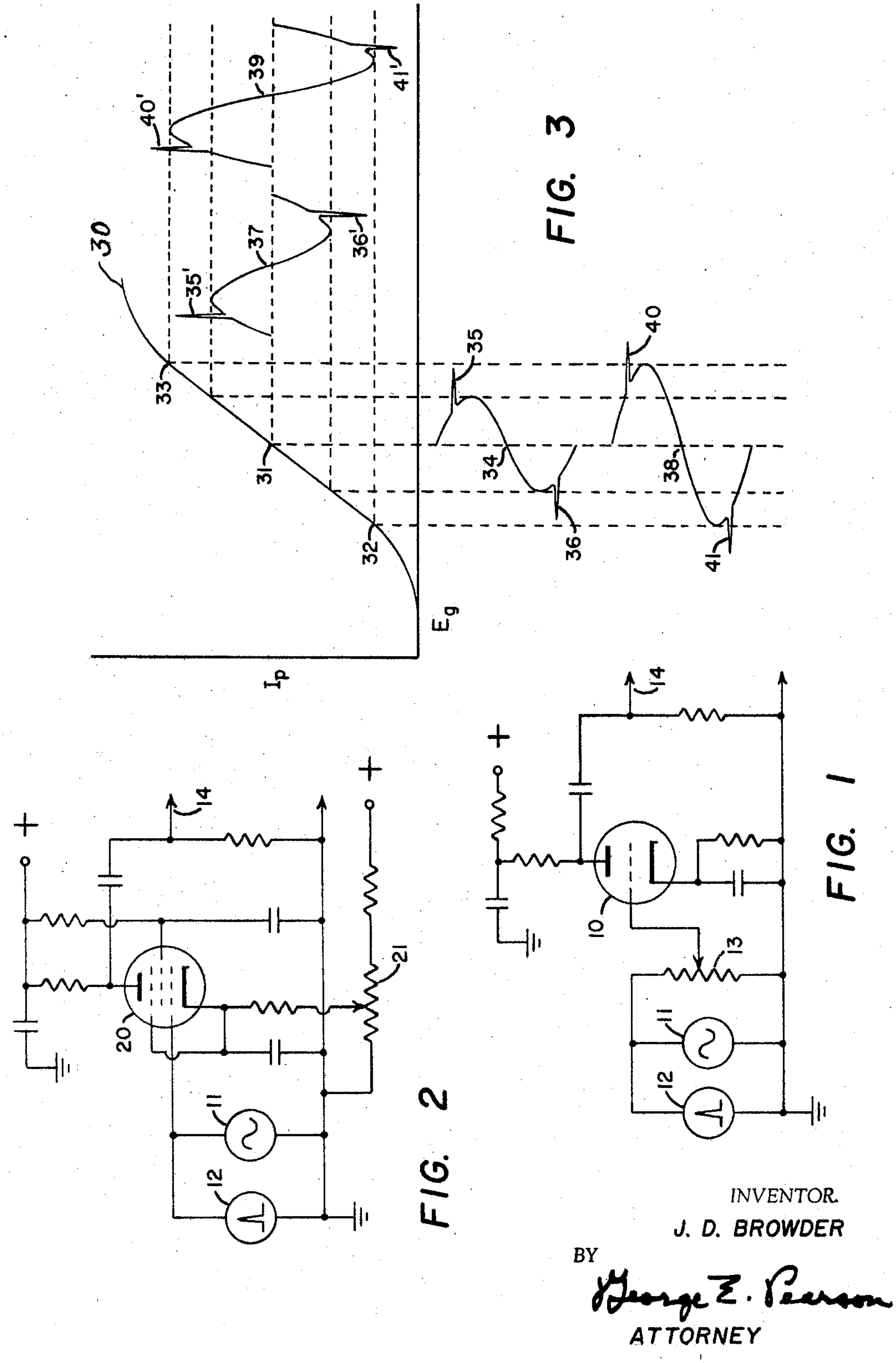
FIGURE 1 is a diagrammatic illustration of a circuit arrangement that comprises essential elements of an amplifying device operable in accordance with the principle of the invention and hereinafter designated by the term "gorged amplifier"
FIGURE 2 is a diagrammatic illustration of an alternate circuit arrangement of a gorged amplifier and providing a diffemt method of controlling the amplifier loading.
FIGURE 3 illustrates the well-known graphical analysis of the grid voltage-plate current characteristic of a vacuum-tube amplifier such as employed in the circuit arrangement of FIGURE 1.

Referring now to FIGURES 1 and 2, it is seen that triode 10 and pentode 20 are chosen as amplifying devices to describe the present invention, and it is understood that concentional transistors can serve equally as well. Signal generator 11 represents a conventional source of sinusoidal signals such as a radio receiving antenna, while pulse generator 12 represents the presence of a source of noise disturbances and its electrical coupling with said signal generator. In actual practice when signals are accompanied by noise disturbances, both are received from the same source such as said radio receiving antenna. Potentiometers 13, FIGURE 1, and 21, FIGURE 2, serve as means for controlling the load, that is, signal loading applied to and carried by said amplifying devices, with the former providing a means for adjusting the amplitude of signals applied to the input of said triode, and the latter providing a means for controlling the bias voltage of said pentode which is of the variable-mu or remote-cutoff variety. Outputs of said amplifying devices are taken at points designated 14. Other appurtenances and their interconnections are so well known that they are assumed to be obvious to persons skilled in the art.

However, it should be understood that various modifications and substitutions can be made in the circuitry of FIGURES 1 and 2, without materially altering the performance of the invention or departing from its spirit and scope. For example, with respect to the plate loads of said triode and pentode, the resistance shown but undesignated may be replaced by a choke coil so as to effect an impedance coupling, or by the primary winding of a transformer for providing a transformer coupling. Also an automatic volume control system may be used to supplement potentiometer control 21 of said pentode.

Operation of the present invention is described by aid of FIGURE 3, and the well-known graphical analysis of a vacuum-tube amplifier. Such analysis is also applicable to transistors since they too have transfer-characteristic curves similar to those of vacuum-tubes, as described in the book RCA Transistor Manual, Technical Series SC–10, page 14, 1962, Radio Corporation of America, Somerville, N.J.

The characteristic grid voltage-plate current curve 30, FIGURE 3, shows the relationship between the instantaneous signal voltage on the grid and the instantaneous current in the plate circuit, with amplitudes of the former measured along the horizontal axis designated $E_g$ and those of the latter measured along the vertical axis designated $I_p$. Substantially Class A biasing is employed to position the operating point 31 approximately at the center of th so-calld linar portion of said curve, which portion lies between the lower and upper knees designated as points 32 and 33, respectively. Between these latter points the plate current may swing, in response to signal voltage on the grid, without causing distortion of the output signal. That is, distortion free maximum output signal amplitude is limited by plate-current excursions which stop at points 32 and 33. If the signal voltage on the grid is increased so as to drive the plate current beyond said points, then distortion results and the amplifier is said to be overdriven, which means driven into saturation during positive input signals and to cutoff during negative input signals.

As the load applied to and carried by a vacuum-tube amplifier may be controlled by the amplitude of input signals, it is well known that various degrees of loading can be carried satisfactorily, ranging from minimum as fixed mainly by the inherent noise factor of the amplifier to maximum as fixed within the limits of said so-called linear portion of the characteristic. Further, the output signal is virtually a facsimile of the input signal except for its greater amplitude. This feature, except under certain conditions as subsequently described, also holds true for a noise disturbance that may accompany the input signal, which results in the signal-to-noise ratio of the output being essentially the same as the signal-to-noise ratio of the input.

An example of this condition is illustrated in FIGURE 3, where the input sinusoid 34 has a noise impulse 35 superposed on the rising side of the positive half-wave and a similar noise impulse 36 superposed on the rising side of the negative half-wave. Clearly these noise impulses produce a deformed sinusoid, which is substantially reproduced in the output as represented by sinusoid 37 having a noise impulse 35' on the rising side of its positive half-wave and an impulse 36' on the rising side of its negative half-wave. Observe that deformed sinusoid 37, with its projecting noise impulses 35' and 36', lies within the linear portion of said characteristic curve 30 between points 32 and 33, and because of this fact it is virtually a faithful reproduction of the deformed input sinusoid 34. Too, it represents a degree of amplifier loading which falls below the full-load capability of the amplifier as determined by plate-current swings between said points 32 and 33.

But it is found that as the amplifier loading is increased, the aforesaid phenomenon which is described as an increased signal-to-noise ratio of the output as compared with the signal-to-noise ratio of the input, begins to manifest itself. That is, the amplifier becomes a signal-to-noise ratio enhancer, with the amount or degree of enhancement being related to and varying with the amount or degree of amplifier loading. Maximum enhancement is approached as maximum linear loading permitted by limiting points 32 and 33, FIGURE 3, is approached. Just why this new phenomenon occurs is not fully understood, but its association with the lower and upper bends of characteristic curve 30 and the fact that noise impulses superpose themselves on sinusoids and add thereto with respect to algebraic signs as formerly discussed, is considered a certainty. This is illustrated by aid of deformed sinusoids having increased amplitudes, such as the input grid-voltage sinusoid 38, FIGURE 3, and the resultant plate-current sinusoid 39, whereby the amplitude of the former is sufficient to load the amplifier to practically its full capacity. With this loading, the noise impulses 40 and 41 of the input sinusoid are now reproduced as plate-current variations occurring essentially in the nonlinear portions of characteristic curve 30 as impulse 40' and 41', and so their amplifications are very small as compared with the amplification of the sinusoid on which they are superposed. This difference in the respective amplifications is or otherwise expresses the aforesaid phenomenon and accounts for the increased signal-to-noise ratio of the amplifier output.

Yet this description of how noise impulses are amplified to a lesser degree than sinusoids is believed to be incomplete, particularly in view of the fact that laboratory tests show that effective performance of the invention is limited by the peak voltage and repetition rate of noise impulses, while the duration and waveform of random impulses have practically no significance. To illustrate, a spike waveform having a duration which is only a small fraction of the period of the accompanying sinusoid and which occurs simultaneously with a crossing of the zero axis by said sinusoid, is suppressed—insofar as measurements indicate—equally as well as when it occurs during a peak amplitude of said sinusoid. Also a random pulse whose duration equals the sum of the periods of a train of successive sinusoids having the same frequency, is suppressed with the same facility as if the duration of said pulse was only a fraction of the period of only one of said sinusoids. It therefore appears that a complete analysis is not confined to a consideration of instantaneous values of plate-current as in the above description, but will also encompass RMS values of the output signal voltage and perhaps the output power both of which—as is well known—are derived from said instantaneous plate-current.

That RMS (and possibly average) values of the amplifier output are of utmost significance is further indicated by the fact that said operating point 31, FIGURE 3, may be shifted appreciably up or down from its center position between points 32 and 33 without materially reducing or otherwise affecting the suppression of noise disturbances. That is, strictly Class A biasing is not an essential requirement. This is again indicated by said remote-cutoff pentode 20, FIGURE 2, which also exhibits the same phenomenon of signal enhancement even though its biasing may vary considerably, depending upon the amplitude of signals applied to its control grid, thus showing that each of several operating points on its characteristic curve yields a linear range for signal amplification and at least one nonlinear portion for impulse amplification. Yet, associated with these features is the essential requirement that said amplifying device must be loaded approximately to its full-load capacity in order to acquire maximum enhancement of the output signal-to-noise ratio as compared with the input signal-to-noise ratio.

Said term, full-load capacity, is defined as the maximum load which said amplifying device can carry or handle without producing signal distortion, that is, signal amplication is restricted to the maximum linear portion of said characteristic. And since said amplifying device is normally operated at or near its full-load capacity, the name or title: gorged amplifier, has been assigned to it for purposes of identification and classification. Accordingly, the term gorged amplifier is used hereinafter in all references to the signal-to-noise ratio enhancer above described by aid of FIGURES 1, 2 and 3.

In view of the foregoing, it should be clear that the sole purpose of said gorged amplifier is to increase the signal-to-noise ratio by the process of amplifying noise disturbances to a lesser degree than that of amplifying signals, and that said process is a manifestation of said phenomenon. While a mathematical analysis of said phenomenon is not available during the preparation of this specification, yet sufficient laboratory tests, investigations and operating experience have been accomplished during recent months to definitely establish the feasibility as well as certain design parameters of said gorged amplifier. Out of these tests and investigations also came the foregoing performance characteristics involving the coincidence of a spike and zero-crossing of a sinusoid as well as the coinciding of a spike with the peak of a sinusoid, pulse durations with respect to sinusoid periods, and that precisely Class A biasing is not essential. Further it was concluded that (a) the gorged amplifier accomplishes its sole purpose by utilizing virtually all of the linear portion of its characteristic curve for amplifiyng signals and the nonlinear portions for amplifying noise disturbances, and (b) this distribution of signals to said linear portion and noise disturbances to said nonlinear portions is the combined result of said noise disturbances being superposed on said signals and the substantially fully loaded operating conditions of the gorged amplifier.

For sake of clarity it is to be understood that the terms noise disturbance, noise impulse, pulse, and spike all are used herein to convey the same general meaning and are thus synonymous. Also the terms signal and sinusoid are likewise synonymous.

If noise pulses superpose themselves on signal sinusoids, as above set forth, then it is reasoned that when the latter is absent the former should be amplified to a far greater degree than when the latter is present. Indeed, this is what happens in actual practice, which offers further verification of aforesaid principle that noise pulses superpose on signals. Therefore the gorged amplifier is not especially suited for use directly with audio-frequency signals such as voice and music, owing to frequent periods of silence or inaction between such signals, during which periods noise disturbances are not suppressed but are amplified in the manner of signals. But when audio-frequency signals become modulations on a radio-frequency carrier, then during the silent or inactive periods between said audio-frequency modulations the radio-frequency carrier is still present and available to provide sinusoids on which noise pulses superpose. Clearly, therefore the gorged amplifier finds its greatest usefulness directly in connection with radio-frequency signals which serve as a vehicle for indirect but, nevertheless, very effective usefulness with audio-frequency signals.

Thus a significant application of the gorged amplifier is in combination with the conventional superheterodyne radio receiver. Here it can be used, (a) in the manner of a radio-frequency preamplifier connected between the receiving antenna and converter or first detector, or (b) as an intermediate-frequency amplifier connected between the first and second detectors. In both positions its performances are virtually equal, as determined by laboratory tests, but from the viewpoint of economy and feasibility its use in the latter position is far the most advantageous. An example of its usual performance is shown by the fact that with a 12AX7 dual-triode connected in push-pull and serving as the gorged amplifier, a noise disturbance having a measured amplitude of approximately three db above that of the accompanying signal (1.41 times signal amplitude) is suppressed or reduced to an amplitude of approximately ten db below the signal (0.316 times signal amplitude), without impairing the signal fidelity and, as a matter of fact, without "peaking-up" the adjustment for acquiring the "last bit" of noise suppression just before the beginning of signal distortion.

Further evidence of the validity of the aforesaid noise-superposition principle is afforded by use of a cathode ray oscilloscope. For it is well known that the deformed sinusoids depicted in FIGURE 3 can be presented on the screen of a cathode ray tube. Also the effects of relative polarities of a sinusoid and superposed impulse are included in the presentation. To illustrate, by reference to sinusoid 34, FIGURE 3, impulse 35 has positive polarity which is the same as that of the half-sinewave on which it is superposed. But if the polarity of said impulse had been in the reverse direction, that is, negative with respect to said half sinewave, then the impulse would descend toward the zero axis.

It is pertinent to note that said phenomenon was found to vary slightly with different types of tubes and transistors, indicating that it may bear a definite relationship with the shape of the particular characteristic curve involved. Since this is believed to be true, then it appears that an improved gorged amplifier might be provided by a new tube, or a new transistor, specially designed to have a characteristic curve whose upper and lower bends are sharpened. With regard to tubes, high-gain triodes were found to be slightly superior to low-gain triodes, and remote cutoff pentodes were found to be almost as good as sharp cutoff pentodes, but neither pentode was found to have any particular advantage over a high-gain triode despite the pentode's higher gain. Further, a single triode such as 10, FIGURE 1, is not quite so effective as two series-connected triodes, and still better performance is yielded by two triodes joined in push-pull.

It was also found that the input impedance of a vacuum tube decreases as the loading approaches full-load capacity, and so it is advantageous to drive a gorged amplifier from a cathode follower especially when a tuned circuit serves as the immediate source of signals and accompanying noise disturbances. A balanced or push-pull cathode follower energized from a tuned center-tapped secondary winding of a coupling transformer has proved to be very satisfactory when driving a push-pull gorged amplifier comprising a 12AX7 dual-triode having a balanced to single-ended transformer in its plate circuits and operating at 455 kc. in the IF section of a conventional radio receiver.

It might be assumed that in practice it is a difficult requirement to maintain the loading of a vacuum-tube amplifier at virtually its full-load capacity, that is, a requirement that necessitates a very careful adjustment to be maintained within relatively narrow limits. Such assumption is erroneous, particularly when the signal amplitude is reasonably constant. Of course, when the amplitude varies considerably at frequent intervals as in the case of a fading radio signal, then an automatic volume control is virtually a necessity. An example of the operating limits within which a gorged amplifier performs satisfactorily is afforded by the abovementioned 12AX7 dual triode connected in push-pull and operating at 455 kc. wherein the amplitudes of input signals are maintained between a minimum of approximately 0.5-volt and a maximum of approximately 0.7-volt. If the input signal amplitude drops much below said minimum value, say to 0.3-volt for example, then the signal-to-noise ratio enhancement is decreased appreciably. Conversely, if the input signal amplitude rises above said maximum value, say 0.9-volt for example, then the output signal is distorted.

Further, it is of interest tot note that the voltage gain of a vacuum-tube amplifier drops as its load is increased to full-load capacity. In the above case of said 12AX7—which is a popular high-gain dual-triode having an amplification factor of 100—a gain of only 18 to 20 is realized and this includes a small contribution by said output transformer. However, this relatively small overall gain is very suitable, since the output signal voltage approximating 10 to 15 volts is appropriate for detection in the 6AL5 diode which follows.

It will be understood that the invention is not limited in scope to the particular circuit arrangements above described, and that various modifications which will occur to persons skilled in the art are contemplated, the scope of the invention being defined by the following claim.

Having described my invention, what I claim as new and useful and desire to secure by United States Letters Patent is:

1. A noise-reducing amplifier for receiving sinusoidal signals of constant amplitude accompanied by noise disturbances superposed thereon and additive thereto with respect to algebraic signs, comprising, an amplifying device and associated circuit elements providing therewith an input, an output, and control means for setting substantially full-load operation of the device at a predetermined level of the input signal and over virtually the whole linear portion of the characteristic curve of the device, whereby said signals are amplified linearly and said noise disturbances are amplified nonlinearly to enhance the signal-to-noise ratio of the output of the amplifier, said amplifying device being a vacuum tube, said vacuum tube being a variable-mu or remote cutoff pentode and said control means being a potentiometer connected in the cathode circuit and adjustable to set the mu of the tube for said full-load operation of the tube.

References Cited

UNITED STATES PATENTS

| | | | |
|---|---|---|---|
| 1,481,284 | 1/1924 | Deardorff | 328—165 X |
| 2,112,705 | 3/1938 | McCaa | 325—479 X |
| 2,140,526 | 12/1938 | Haffcke | 325—479 X |
| 2,153,969 | 4/1939 | McCutchen et al. | 325—479 |
| 2,305,842 | 12/1942 | Case | 328—165 X |
| 2,373,241 | 4/1945 | Field | 330—149 X |
| 3,167,721 | 1/1965 | Broadhead | 325—482 X |
| 2,230,243 | 2/1941 | Haffcke | 330—142 X |
| 2,266,713 | 12/1941 | Meier | 325—453 X |
| 3,179,819 | 4/1965 | Lockwood | 307—88.5 |

OTHER REFERENCES

TM11-668, F-M Transmitters and Receivers, September 1952, pp. 155–157.

Terman: Radio Engineering, 3rd edition, McGraw-Hill, New York, 1947, pages 270–272, 326–327.

Villchur; "Handbook of Sound Reproduction," Audio Engineering, September 1953, p. 36.

ROY LAKE, *Primary Examiner.*

J. B. MULLINS, *Assistant Examiner.*